United States Patent
McGuire

(10) Patent No.: US 8,694,348 B2
(45) Date of Patent: Apr. 8, 2014

(54) SYSTEMS AND METHODS FOR TASK-BASED DECREASING PRICE MARKETS

(75) Inventor: Daniel Owen McGuire, Quincy, MA (US)

(73) Assignee: SkinnyPrices, Inc., Boston, MA (US)

( * ) Notice: Subject to any disclaimer, the term of this patent is extended or adjusted under 35 U.S.C. 154(b) by 71 days.

(21) Appl. No.: 13/399,689

(22) Filed: Feb. 17, 2012

(65) Prior Publication Data

US 2012/0215601 A1      Aug. 23, 2012

Related U.S. Application Data

(60) Provisional application No. 61/463,592, filed on Feb. 18, 2011.

(51) Int. Cl.
*G06Q 10/00* (2012.01)
(52) U.S. Cl.
USPC .......................................... 705/7.11
(58) Field of Classification Search
USPC ................................. 705/7.29, 7.11
See application file for complete search history.

(56) References Cited

U.S. PATENT DOCUMENTS

| | | | |
|---|---|---|---|
| 5,053,957 A | 10/1991 | Suzuki | |
| 6,978,253 B2 | 12/2005 | Lin | |
| 7,024,376 B1 | 4/2006 | Yuen | |
| 7,577,589 B2 * | 8/2009 | Sandholm et al. | ............ 705/26.3 |
| 7,647,252 B2 | 1/2010 | Rampell et al. | |
| 7,698,171 B2 | 4/2010 | Rampell et al. | |
| 7,788,139 B2 | 8/2010 | Rampell et al. | |
| 7,848,960 B2 | 12/2010 | Rampell et al. | |
| 7,970,649 B2 * | 6/2011 | Wu | ............................. 705/14.53 |
| 7,970,690 B2 | 6/2011 | Diana et al. | |
| 7,996,298 B1 | 8/2011 | Catane | |
| 8,185,434 B2 * | 5/2012 | Bous | ........................... 705/14.1 |
| 8,280,779 B2 | 10/2012 | Davis et al. | |
| 8,301,543 B2 | 10/2012 | Seaman | |
| 8,311,845 B2 * | 11/2012 | Vengroff et al. | ............... 705/1.1 |
| 2002/0052788 A1 | 5/2002 | Perkes et al. | |

(Continued)

OTHER PUBLICATIONS

M. Rappa, "Business Models on the Web," www.digitalenterprise.org (Jan. 17, 2010) (downloaded Feb. 23, 2012).

(Continued)

*Primary Examiner* — Romain Jeanty
(74) *Attorney, Agent, or Firm* — Foley & Lardner LLP; Christopher J. McKenna; Shabbi S. Khan

(57) ABSTRACT

Embodiments of task-based, decreasing-price markets enable dynamic discounting of items for sale. In one example, users shop for products (e.g., clothing, electronics, or cars) or services (e.g., hotel rooms, plane tickets, or car rentals) using a computing device or mobile device. As the users shop, they view advertisements or perform other tasks, like answering questions, and the system discounts an item's price based on the number or complexity of the performed tasks. Each user who performs a task gets a chance to buy the item at its discounted price. The other users also get a chance to buy the item at the discounted price. If someone buys the item, the item's price returns to its starting value. If nobody buys the item, the system discounts the item's price further as the users perform more tasks until someone buys the item or the item's price reaches a minimum value.

20 Claims, 9 Drawing Sheets

(56) References Cited

U.S. PATENT DOCUMENTS

| | | |
|---|---|---|
| 2002/0165771 A1 | 11/2002 | Walker et al. |
| 2007/0239560 A1 | 10/2007 | McGuire et al. |
| 2009/0018909 A1 | 1/2009 | Grecia |

OTHER PUBLICATIONS www.beezag.com (downloaded Feb. 24, 2012).

www.dubli.com (downloaded Feb. 24, 2012).

International Preliminary Report on Patentability issued Aug. 29, 2013, in PCT Application no. PCT/US2012/025681.

International Search Report and Written Opinion in PCT/US2012/025681 dated Jun. 28, 2012.

US Notice of Allowance in U.S. Appl. No. 13/888,571 dated Jul. 26, 2013.

* cited by examiner

SYSTEMS AND METHODS FOR TASK-BASED DECREASING PRICE MARKETS

CROSS-REFERENCE TO RELATED PATENT APPLICATIONS

This application claims the benefit under 35 U.S.C. §119 of U.S. Application No. 61/463,592, entitled "Decreasing Price Market Tied to Advertising or Company Paid Incentive Method and System," which was filed on Feb. 18, 2011, and which is incorporated herein by reference in its entirety.

BACKGROUND

Traditionally, businesses have used many different pricing models for e-commerce. For instance, eBay allows users to buy and sell items in a traditional auction. Priceline uses a pricing structure that allows sellers to compete for business by trying to meet a buyer's desired price. Other entities, such as Groupon, combine aspects of traditional coupons with group buying power to offer incentives to both buyers and sellers. In a penny auction, a user pays for the opportunity to bid on an item whose price drops with each bid.

SUMMARY

Disclosed embodiments include a system and method of price discounting. In one case, the system includes a device, such as a server, that provides a representation of an item for sale to a plurality of users. The item has a retail price and a discount price, which is discounted from the retail price based on tasks performed by one or more of the plurality of users. For instance, the discount price can be discounted from the retail price based on a number of tasks performed by users in the plurality of users. A task module of the device communicates, to a first user in the plurality of users, information on a task to be performed by the first user and receives an indication that the first user has performed the task. A discount module of the device reduces the discount price of the item in response to the indication that the first user has performed the task, and the device provides the item for purchase at a price equal to or less than the reduced discount price to each user of the plurality of users until any user of the plurality of users purchases the item at the reduced discount price.

In one example, the task comprises viewing an advertisement, answering a question about a product or service, participating in a survey, providing an opinion, providing demographic information, providing information about a past or future purchase, signing up for a mailing list, or downloading an application or file. The task module may also determine or select the task based on a third-party specification or based on information about the item, the first user, or the plurality of users. For example, a task module may use information about the first user's age, income, gender, purchasing history, internet browsing history, or internet protocol address to determine the task. Similarly, the discount module (or another device) may reduce the discount price based on the indication that the first user performed the task, a purchasing history associated with the first user, or a browsing history of the first user.

In another example, the server or other device may receive a request from the first user to view the discount price of the item before the first user can view the discount price. The server or device may also prevent any user in the plurality of users from viewing the discount price before the first user has performed the task, e.g., as determined from the indication that the first user has performed the task. Once a user in the plurality of users has purchased the item at the reduced price, the discount module enables each user in the plurality of users to purchase the item at the retail price.

In still another example, the server or device may receive an indication that a second user in the plurality of users has performed another task. Upon receiving such an indication, the discount module in the server or device can reduce the discount price based on the indication that the second user in the plurality of users has performed the other task. The discount module may use this reduced discount price as the basis for future price reductions.

A system may also include a conversion rate module that performs additional price-discounting actions as part of a corresponding method. For instance, the conversion rate module can determine a conversion rate at which a user in the plurality of users purchases the item at the discount price per a number of tasks performed. The conversion rate module may also adjust a model used by the device to determine the price based on the conversion rate.

Another disclosed embodiment includes a method of providing a decreasing price market. The system includes a device, such as a server, that provides a representation of a plurality of items for sale to a plurality of users. Each item of the plurality of items has a respective retail price and a respective discount price, which is discounted from the respective retail price based on tasks performed by one or more of the plurality of users. When a first user in the plurality of users views a first item of the plurality of items, the device provides information relating to a task to the first user. When the device receives an indication that the first user has performed the task, the device determines a reduced discount price of a second item of the plurality items. The device responds to the indication that the first user has performed the task by providing the second item for purchase at the discount price to each user of the plurality of users until any user of the plurality of users purchases the second item at the discount price of the second item. In some examples, the system may prevent any user in the plurality of users from viewing any discount price before the first user has performed the task.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The accompanying drawings, which are incorporated in and constitute a part of this specification, illustrate embodiments of the disclosed technology and together with the description serve to explain principles of the disclosed technology.

DETAILED DESCRIPTION

Following below are more detailed descriptions of various concepts related to, and embodiments of, inventive systems, methods, and apparatus for task-based decreasing price markets. The concepts introduced above and discussed in greater detail below may be implemented in any of numerous ways, as the disclosed concepts are not limited to any particular manner of implementation. Examples of specific implementations and applications are provided primarily for illustrative purposes.

An Overview of Task-Based Decreasing Price Markets

One example of the technology disclosed herein is a method for implementing a task-based decreasing price market based on dynamic, variable pricing. As used herein, a market is a forum for exchanging goods and services; typically, one or more sellers offer goods and services to one or more buyers. A task-based decreasing price market is a market in which the seller lowers the price of an item when a first buyer completes a particular task and uses this reduced price, or discount price, as the basis for future offers to other buyers depending on whether or not the first buyer purchases the item at the discount price. The seller may lower the price every time a buyer completes a task until someone buys the item, at which point the seller may raise the price (e.g., to its original value).

In some embodiments, the tasks may involve the transfer or exchange of information. For instance, the system may present or transfer information to the user, e.g., in the form of an advertisement. The system may also receive information from the user, e.g., in the form of answers to questions about the user's identity, habits, or preferences. A task may involve or include the transfer of information from the system to the user, from the user to the system, or both.

Figure 1:
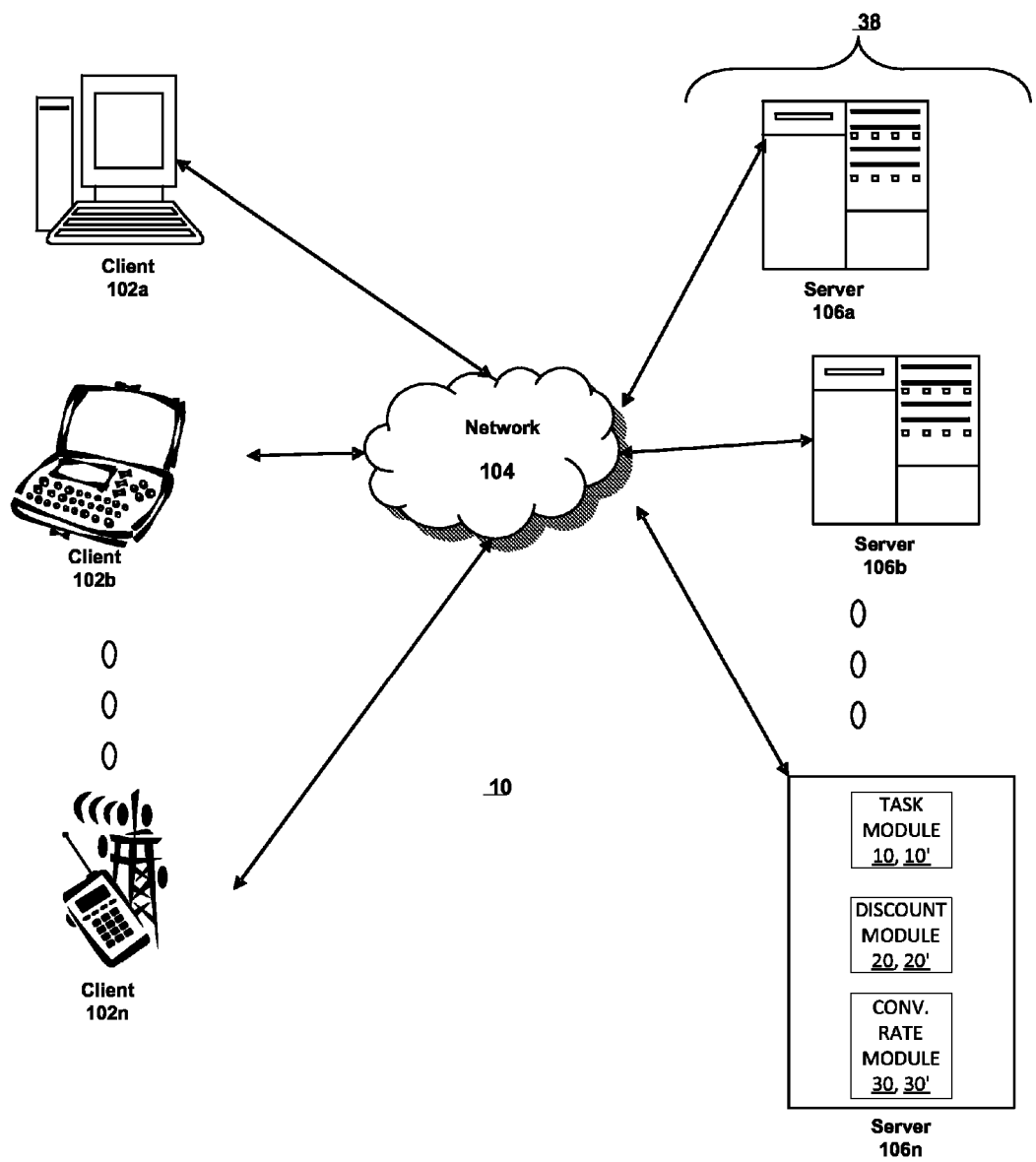
FIG. 1 depicts a computer network environment suitable for carrying out a task-based decreasing price market.
Figure 6:
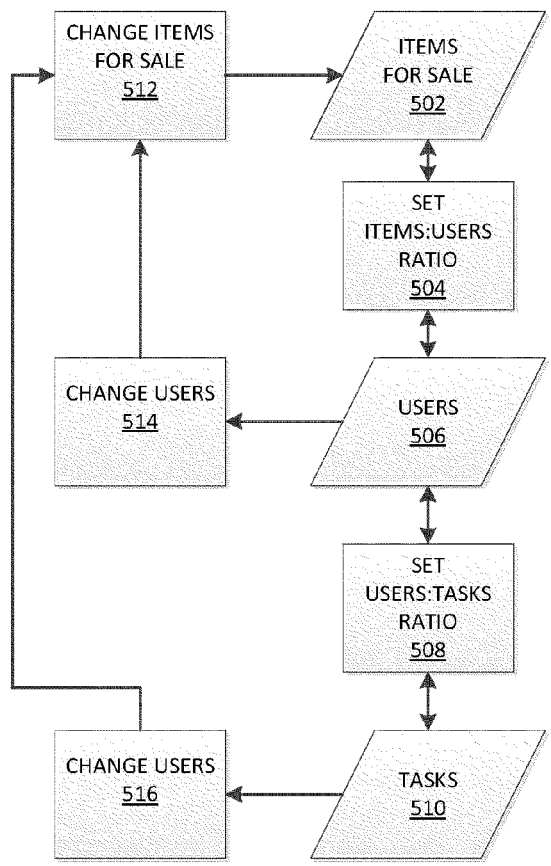
FIG. 6 illustrates relationships among items for sale, users, and tasks in a model used to determine price changes in a task-based decreasing price market.

FIG. 1 shows a computer network environment 10 suitable for implementing a task-based decreasing price market. The computer network environment 10 includes one or more servers 106a-106n (collectively, "servers 106") coupled to one or more clients 102a-102n (collectively, "clients 102") via a network 104, such as the Internet. Each server 106 and each client 102 may be implemented as a separate computer device, e.g., as shown in FIGS. 6 and 7 and described below. As understood by those of skill in the art, one or more of the servers 106 may be configured to exchange information with one or more of the clients 102 via physical links, such as fiber-optic and Ethernet links coupled to routers, switches, etc. that make up the network 104. The severs 106 and clients 102 may also be able to send and receive information wirelessly via the network 104.

At least one server 106 (e.g., server 106n) may include a task module 10, a discount module 20, and a conversion rate module 30. Each module (the task module 10, the discount module 20, and the conversion rate module 30) can be implemented as processor-executable instructions ("software" or "code") stored in volatile or nonvolatile memory in or accessible by the server 106n. A particular client 102 may also execute, store, or execute and store one or more portions of the code associated with the task module 10, the discount module 20, and the conversion rate module 30. Each module 10, 20, and 30 may also be implemented in firmware, hardware (e.g., as application-specific integrated circuits, field-programmable gate arrays, or another general- or special-purpose processor), or as any suitable a combination of software, firmware, and hardware.

The task module 10 provides and processes information relating to a task performed by a user participating in a task-based, decreasing-price market. The task module 10 is communicatively coupled to at least one of the clients 102 and may also be communicatively coupled to one or more of the other servers 106, e.g., via the network 104. The task module 10 is configured to provide task information to a client 102 in response to a request for task information from that particular client 102. Exemplary task information includes, but is not limited to information that the client 102 may use to present a particular task to a user. For instance, task information may include instructions and data for presenting an advertisement to the user (including the advertisement itself), instructions for presenting questions to the user, instructions for recording the user's replies to those questions, etc. The task module 10 may select the task information from among predetermined task information stored in the server's memory, in the client's memory, or in another memory. The task module 10 may also formulate the task information in real-time based on an analysis of the user's past behavior, the behavior of other users, general market trends, or third-party instructions.

The task module 10 may also be configured to process information, provided by the client or the user, that relates to the user's performance of the task. For instance, the task module 10 may be configured to process the user's responses to questions that form part of the task. In processing the user's responses, which may be provided via the client, the task module 10 verifies that the user has completed the task successfully or to a predetermined degree of satisfaction.

The discount module 20 is communicatively coupled to the task module 10. The discount module 20 is configured to change the price of one or more items for sale in response to an indication from the task module 10 that a user has performed a task satisfactorily. The discount module 10 may be configured to reduce the price of an item by a predetermined amount, such as a fixed amount (e.g., 50 cents), a progressively decreasing amount (e.g., 5% of the current price), a progressively increasing amount, an arbitrary amount, or any other suitable amount. The discount module 20 may select the price reduction based on instructions from the seller, instructions from a third party, an analysis of the user's past purchasing habits, a prediction of the user's likely purchasing decision, an analysis of market behavior, etc.

The conversion rate module 30 is communicatively coupled to the discount module 20 and is configured to track the rate at which users purchase items. The conversion rate module 30 may include or be coupled to a memory in which the conversion rate module 30 stores information relating to each user's purchasing habits, including the user's profile (e.g., demographic information), a description of the item for sale, the item's price, the item's retail price, the item's viewing popularity, the item's sales rate, the user's past purchases, the user's location, the time of day, the day of the week, the time of year, etc. The conversion rate module 30 may also be configured to analyze the relationship(s) among the conversion rate and the stored information. The conversion rate module 30 may be configured to provide feedback based on this analysis to the task module 10 and the discount module 20 so as to increase the likelihood that the user will purchase the item being viewed.

In some embodiments, the server 106n includes a task module 10' that is also configured to select the task based on the relationship between a first item viewed or selected by the user and a second item whose price is reduced based on the user's performance of a task. In these embodiments, the server 106*n* may also include a discount module 20', communicatively coupled to the task module 10', that is configured to decrease the second item's price based on the user's performance of a task. Such a server 106*n* may also include a conversion rate module 30', communicatively coupled to the discount module 20', that is configured to determine the conversion rate for the second item, possibly based on the relationship between the first item and the second item.

Participating in a Task-Based Decreasing Price Market

Task-based decreasing price market-style pricing could be used as a basis for an e-commerce website or as a software application that could be plugged into an existing website. In one example, a website master installs a software application to create a decreasing price market button near an "Add to Cart" button or "Shopping Cart" button. If the user presses the decreasing price market button, the website displays a commercial to the user and prompts the user to answer a question before displaying the current discount price to the user. This plug-in or software service operates in the website's back end, allowing the website operator to offer task-based decreasing price markets with minimal effort. The website operator may be charged a license fee or may be required to pay a royalty to use this technology.

Suppose that a user is interested in a new pair of pants. The user finds a pair of pants on a website that retails for $50 and clicks the website's decreasing-price-market button, which might be labeled "Skinny Price It!" or "Price-o-fy," next to or near an "Add to Cart" button. The browser displays a pop-up screen to the user that tells the user that performing a task (such as watching a commercial) will give the user a chance to view a discounted price for the pants. The user watches a commercial for a truck and answers a question about the commercial: "What color is the truck in the commercial you just watched? Red, white, or blue?" (The advertisement or task could also be directed to item for sale or to the user.) If the user answers this question correctly, the browser displays a pop-up window or other message that says, "Thank you! You just helped lower the price of a product." In response to the user's correct response, the browser shows a current discounted price—e.g., $43.30—for the pair of pants.

Figure 2A:
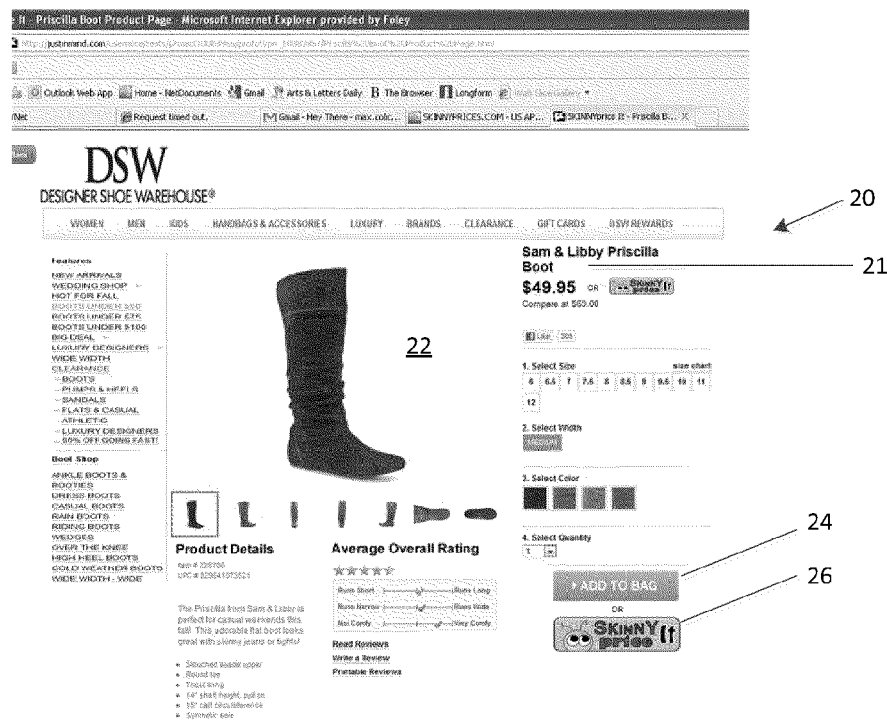
FIGS. 2A-2F show screen shots of a task-based decreasing price market that can be carried out using the computer network environment shown in FIG. 1.

FIGS. 2A-2F illustrate an embodiment of how a user (buyer) participates in a task-based decreasing price market. To start, the user shops for clothes, electronics, cars, hotels, plane tickets, car rentals, etc., on a website using client 102*b*. As the user shops, the user views pictures or descriptions 20 of goods or services on a website or app with his or her client 102 (e.g., client 102*b*) as shown in FIG. 2A. In some embodiments, the displayed information 20 may include the retail price 21 of the item for sale. During shopping, the server 106*n* offers the user an opportunity to participate in the decreasing price market, e.g., by clicking on a participation button 26 displayed on the website (e.g., near a shopping cart button 24) via the client 102*b*. When the user clicks the participation button 26, the client 102*b* sends a request for task information to the server 106*n*. The task module 10 in the server 106*n* responds to the task request by sending the task information to the client 102*b*. The client 102*b* uses the task information to present the task to the user.

In some cases, the task module 10 sends task information that includes complete information about the task, including but not limited to: advertisement information (e.g., the advertisement itself); demographic survey questions; questions about products, brands, advertisements, or political issues; contact information about sales of a particular product or service (lead generation); etc. In other cases, the task module 10 sends task information that simply triggers the task. For instance, the task module 10 may send a message to the client 102*b* that instructs the client 102*b* to select and display one of several video advertisements stored in the client's local memory, e.g., based on a random selection, the user's past viewing or purchasing history, other users' past viewing or purchasing history, instructions from a third party, etc.

Figure 2B:
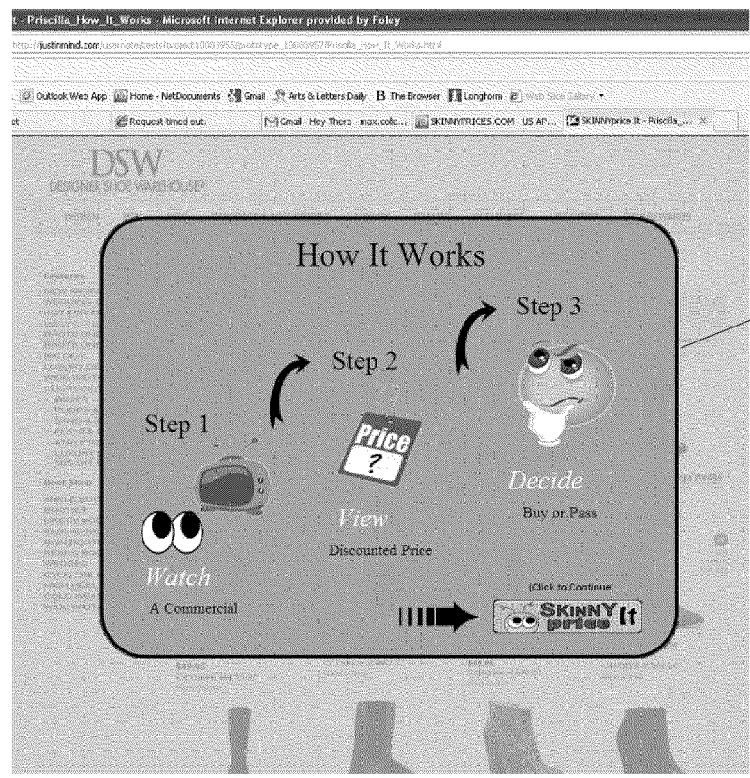
Figure 2C:
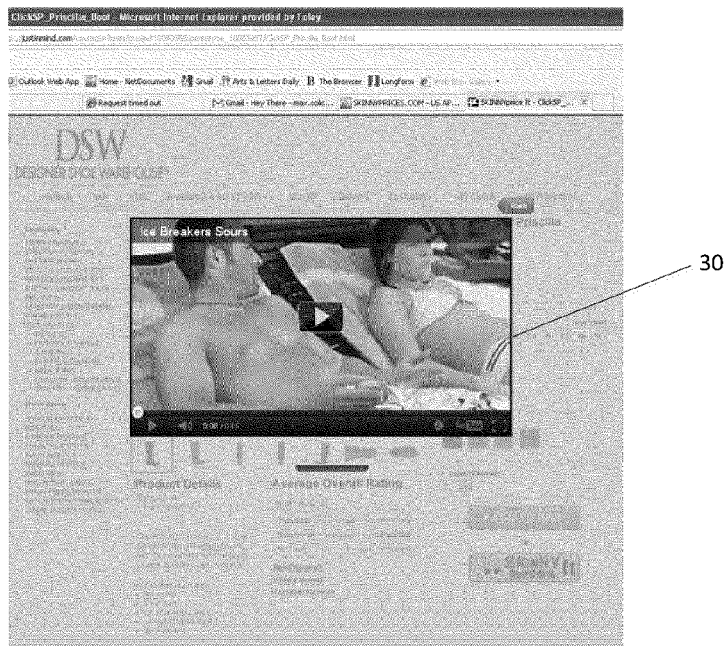

For new users, or users who want additional instruction, the client 102*b* may display instructions 28 that illustrate how the decreasing price market works as shown in FIG. 2B. These instructions 28 may be static (e.g., in the form of text, pictures, or both) or dynamic (e.g., in the form of video or animation). Once the user has read the instructions 28 (or simply decided to skip directly to performing the task), the user proceeds to the task itself, which in this case involves watching an advertisement 30, as shown in FIG. 2C. In some embodiments, the browser prompts users to answer questions about their interests, hobbies, buying habits, future purchases, or income. For example, the users may provide demographic information on themselves to earn credits that let them view discounted prices without watching commercials or performing other few tasks. In one case, the browser may prompt the user to answer a question in return for skipping commercials: "What is your yearly income? By answering this you can skip 5 commercials."

Once the user has watched the advertisement 30, the client 102*b* sends a verification to the server 106*n* that the user has actually performed the task. For instance, the client 102*b* may ask the user a verification question 32 (e.g., "The man at the end was wearing?") as shown in FIG. 2C, collect the user's answer to the verification question 32, and send the user's answer to the server 106*n*. In some embodiments, the user's performance may involve providing information (e.g., an answer to a survey question) that can be used for verification. The server 106*n* receives the verification information, and the task module 10 verifies that the user has indeed completed the task.

Figure 2D:
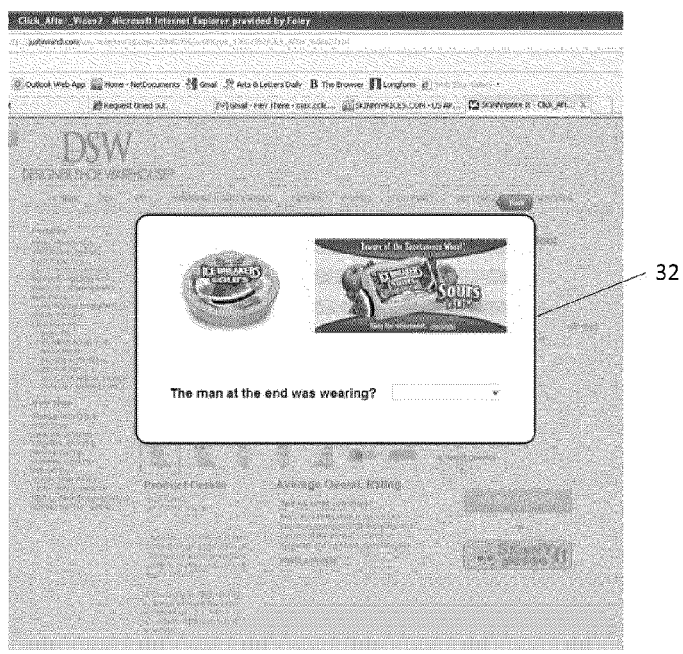
Figure 2E:
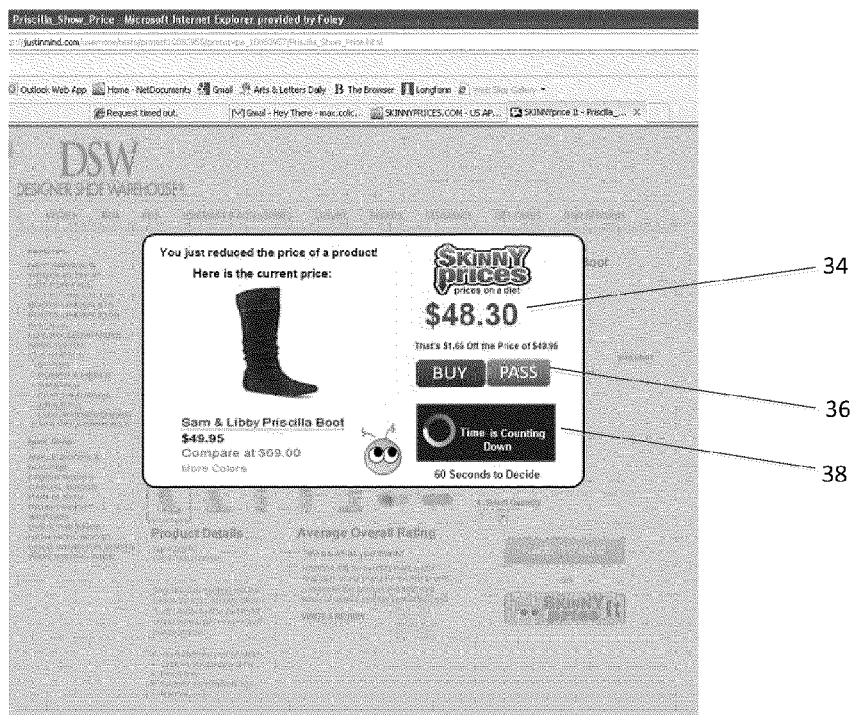
Figure 2F:
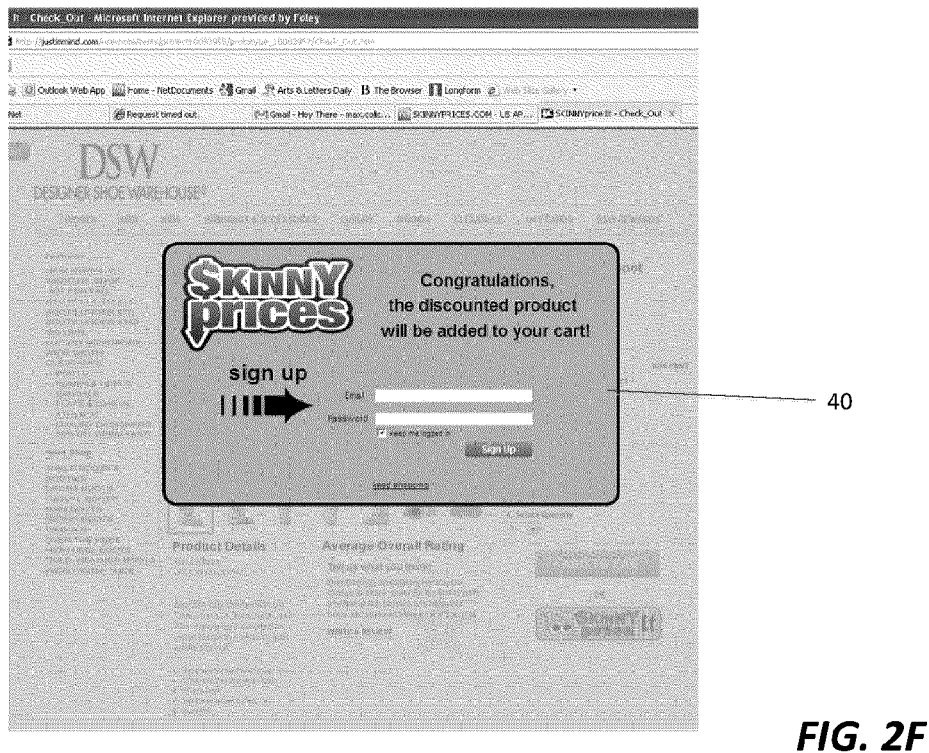

The discount module 20 reduces the price of one or more of the items for sale in response to verification that the user has completed the task and displays a discount price 34 to the user, as shown FIG. 2D. The client 102*b* enables the user to buy or pass on the item at the discount price 34, e.g., by providing appropriate buttons 36. If the user buys the item at the discount price 34, the client 102*b* may display a form 40 that enables the user to enter his or her purchasing credentials (e.g., user name, password, payment method and authorization, shipping address, billing address, etc.). If the user decides not to buy the item, the client 102*b* may display a pop-up or other information that asks the user, "Why did you decide not to buy?," or "What price would you buy at?" In some cases, the client 102*b* may offer the user the chance to name his or her price and to purchase the item at the named price (provided that the named price is authorized), possibly in return for performing one or more extra tasks.

Whether or not the user decides to buy the item, the client 102*b* may also display information about opportunities to purchases additional products at discounted prices. For instance, the client 102*b* may offer the user the chance to buy a second copy of the item at the discounted price. The client 102*b* may offer the user the chance to buy related items at discounted prices or give the user a coupon good for future discounts or a credit good for viewing discounted prices without having to perform a task.

In some cases, the client 102*b* may display a clock or countdown timer 38 that indicates how long (e.g., 60 seconds) the discounted price is good for. This might prompt the user to decide whether or not to purchase the pants or to pass. If the user purchases the pants, the system lists the pants at retail price (e.g., $50) and resets the discount pricing process. If the user decides not to buy the jeans at the current discounted price, the client or the server saves the current discounted price as the starting point for the next user. The random price and countdown clock each create a buying impulse for consumers. Each user must decide if the current discounted price is right for them.

Depending on the status of the decreasing price market, the discount module 20 may reduce the price from an original price (e.g., retail price) to a discount price, or the discount module 20 may further reduce an already-reduced discount price. The discount module 20, via the server 106n, provides every user in the group (e.g., everyone who can access the website via a client 102, all users in a particular market segment, etc.) with the opportunity to buy the item at its new reduced price. Every time someone in the group completes a task, the item's price drops further, until eventually someone in the group buys the item. In some cases, the price may drop all the way to zero; in other cases, the price may drop to a predetermined value (e.g., wholesale value or cost). As soon as someone buys the item, the item's price increases, e.g., to its original (retail) value or to a predetermined value (which may be discounted from the retail value).

This decreasing price market, which allows users compete against each other for discounted goods and services, can be driven by advertising dollars or other such revenue from companies willing to pay to lower prices for consumers. The drop in price may also be supplemented with the difference between wholesale price and retail price minus profit margin desired. That is, the company may use some of its profit margin to offset the cost of discounting the item. For instance, instead of giving new customers 20% off, a company may apply the cost of an across-the-board discount to a pricing system that lowers prices even more effectively. In addition, the company may control the number of users eligible to participate in a decreasing price market, the number of products and services eligible for discounting, and the rate at which the products and services change in price using a server 106 or other suitable electronic device.

In some embodiments, the system may generate leads, and the revenue generated from the leads may go into a pool. This revenue pool could be used to lower the prices of products being viewed by users. The system may drop each price by a random amount, an amount based on user purchasing history, an amount based on sales of the same item or related items, an amount based on third-party instructions, etc. The system may present the reduced price to a user as a one-time discount price. When someone does buy an item at its discount price, the item's price resets to its retail value before dropping again. The system regulates how much money comes in via lead generation, and may also regulate the money applied to price discounts. For instance, the system could allocate more or less money to discounting popular items, giving discounts to loyal viewers, discounting clearance items, etc.

One added value for a website that uses task-based decreasing price market pricing is an increase in conversion rates for purchases. The profit from each sale may be supplemented by advertising dollars or other third-party payments to discount the products in return for specifying tasks done by the users or receiving information relating to tasks done by the users. Task-based decreasing price markets represent a change in the value proposition of advertising. In the traditional model, a consumer views an advertisement to access media content (e.g., a television show). In task-based decreasing price markets, the value proposition for consumers is better prices—for the items the consumers want to purchase—in exchange for viewing advertisements.

Another added value for the website is the increase in web traffic. The average user may spend more time on the website per visit, and the total number of visits to the website may increase as each user comes back to the website to check prices again and again. With decreasing price market pricing, a user may decide the product is too expensive today, but would realize that if they come back there is a chance that the product could be at a price they are willing to pay. This motivates the users to return to the website many time more than if the website uses a traditional pricing system. Conversely, if the price was static (e.g., at retail price or a constant discount), the user might look at the product, decide they couldn't afford it, and never return to the website again.

A Single-Item Task-Based Decreasing Price Market

Figure 3:
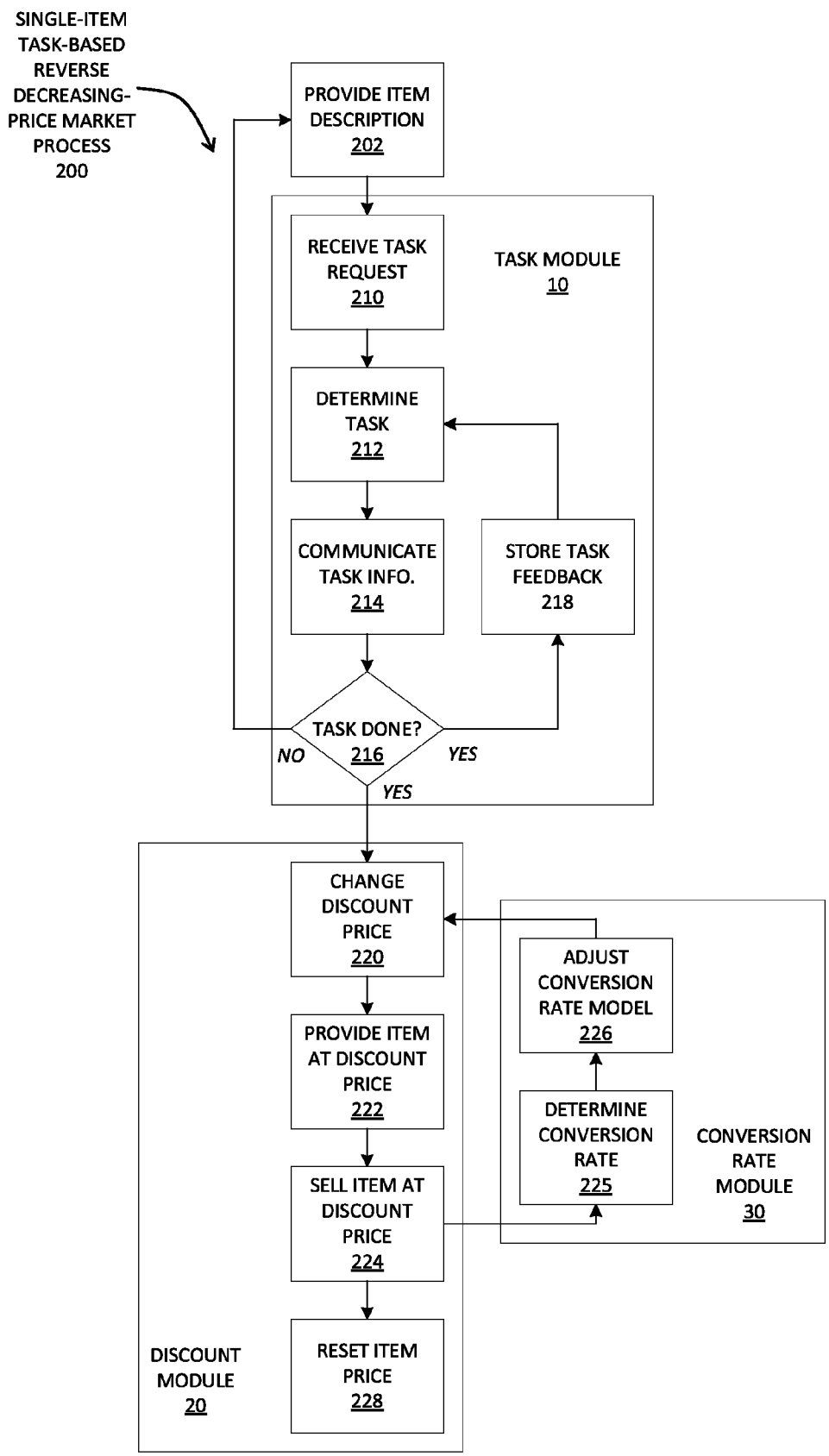
FIG. 3 illustrates a single-item task-based decreasing price market that can be carried out using the computer network environment shown in FIG. 1.

FIG. 3 is a flowchart that illustrates a task-based decreasing price market process 200 for a single item. Like all the embodiments of the decreasing price markets disclosed herein, the process 200 can be implemented using a suitable computer-based system or environment, including the one shown in FIG. 1. The process 200 begins in step 202 with a server (e.g., server 106n) or other electronic device providing a description of an item for sale to one or more users (e.g., via clients 102). The description may include photographs or illustrations of the item, a text description of the item, and user reviews of the item. In some embodiments of the process 200, the description includes the item's retail price, its current (discount) price, or both; in other embodiments of the decreasing price market, the server 106 prevents (e.g., does not provide or cause) the client 102 from displaying the discount price until after the user has completed a particular task.

Hiding the discount price may encourage users to treat shopping like a game, which in turn may cause users to adopt different shopping styles. For instance, a given user may follow a single product by performing tasks and checking prices often until eventually deciding to purchase the item. Another user may follow a "browsing" style: the user may look at different products and, if a particular product is at a good discount price, the user may purchase it. Otherwise, the user may continue browsing.

Performing Tasks to Lower Prices

While browsing, a particular user may decide to participate in the task-based decreasing price market, e.g., by clicking a button displayed on a website or app via the client. The user's action causes the client to send a task request to the server, which receives the task request in step 210 using a task module 10. The task module 10 determines a particular task in step 212, e.g., from among a number of predetermined tasks in a fixed or random rotation. The task module 10 may also determine the task based on information about the user, such as the user's internet protocol (IP) address; feedback from the user, such as data about the user's purchasing habits; feedback from other users, e.g., in the same demographic group; or any other suitable information. In another case, the task module 10 may formulate the task in real time based on information gathered about the user during the browsing session. In some embodiments, the task module 10 may determine or select the task based on a third-party request. For example, the task module 10 may select a particular advertisement (e.g., for a car) or set of questions (e.g., about the advertisement or the car) as the task based on a request from an advertiser or polling organization.

Suitable tasks include, but are not limited to: viewing an advertisement, answering a question about a product or service, participating in a survey, providing an opinion, providing demographic information, providing information about a past or future purchase, signing up for a mailing list, and downloading an application or file. Other suitable tasks include, but are not limited to: taking a 360-degree virtual tour of a product or space, such as a hotel room; customizing a product (e.g., a user may build and price a car, add details to sneakers, or dress a model with clothing); sharing content with friends through social media; provide referrals (leads) for a particular service (e.g., by giving friends' email addresses); agreeing to perform product testing and providing results of product testing; providing reviews of products (e.g., to e-commerce sites, such as Amazon.com or Yelp.com); providing explanations of purchasing decisions; submitting ideas for new products or brands; rating or reviewing existing or proposed products (e.g., voting on new clothing designs for the next season); and rating the quality or relevance of video content. A task may also involve viewing and cataloging video content or other content (e.g., a 30-second video clip) to facilitate content searches.

In step 214, the task module 10 sends information relating to the task, such as data for displaying an advertisement or a set of questions, to the client for presentation to the user. In some cases, the task information may include everything that the client needs to prompt the user to perform the task, e.g., streaming video when the task involves viewing an advertisement. In other cases, the task information may prompt the client to retrieve locally or remotely stored information. For instance, the decreasing price market server may prompt the client to retrieve streaming video from another server or site (e.g., YouTube). The task module 10 may communicate this task information via any suitable channel or network, including, but not limited to wireless channels, wired channels, and combinations of wired and wireless channels.

Verifying Task Performance

In step 216, the server or the client verifies that the user has performed the task in response to the user's performance of the task. For instance, the server or the client may prompt the user to answer a question about the task, such as naming the color of a car displayed in an advertisement, or to decipher a verification puzzle, such as a Captcha phrase or picture. In some embodiments, the task itself may yield verification information, such as answers to survey questions.

Even if the user completes the task, it is still possible for the user to answer the verification question incorrectly. In some cases, the client may use a pre-verification prompt to reduce the chances of getting such a "false negative" verification. The pre-verification prompt may include information that foreshadows the verification question: for instance, the pre-verification prompt may involve telling the user to pay attention for an image (e.g., a logo), phrase, or event depicted during an advertisement. During the advertisement, the client displays the image in a randomly selected location on the screen (e.g., the top left corner, top right corner, bottom left corner, or bottom right corner), in a particular color, etc. In cases where the client displays an image, the client may display the image for a brief, randomly selected interval during the advertisement. At the end of the advertisement, the client asks the user to identify the location of the image and uses the answer to verify that the user has completed the task.

Verification prevents bots or other automated means from gaming the decreasing price market or artificially depressing the discount price. If the task module 10 determines that the user has not performed the task or has performed the task inadequately, the task module 10 may prompt the website or app to display the item description again or to display a message indicating that the task has timed out. The task module 10 may also reset or time out if the task module 10 does not verify that the user has completed the task within a fixed period (e.g., five minutes).

Verification also provides an opportunity to get feedback from the users on the tasks, the items for sale, or anything else of interest. Feedback can include the answers to questions answered by the user in performing the task or in responding to a verification question that the user answers after performing the task. The task module 10 stores this feedback in a database or data store hosted in local or remote memory in step 218. As described above, the task module 10 may use this feedback information to determine the task for the user to perform.

Revenue can also be made for substituting the verification question for a survey or lead generation question. For instance, the server or client could prompt a user to answer a question about the subject of an advertisement (e.g., the car in a car commercial). The server or the client collects this data for sale to the car manufacturer or the advertising agency. The client or server could also prompt the user to redraw the company's logo or come up with a new tag line. In another example, the user plays a game that the company has created that is used to create brand awareness. In other words, the company pays to discount the product using this model for the user doing something for the company.

In another example, the server or client could prompt a user to answer a question about their planned purchases (e.g., "Do you plan to buy a car in the next month, 3 months, 6 months, 12 months?"). This is an example of lead generation; the leads could be sold back to the car company. Another avenue for revenue generation is to collect and sell data on the users using the system. This information about demographics, buying habits, preferences, etc. could be sold to an interested third party or kept to refine operation of the website.

As understood by those of skill in the art, the client or the server can perform any of these task-related actions. In some embodiments, the user's action may cause the client itself to receive and process the task request as described above using a task module 10 or another suitable module or component. For instance, a dedicated app or application on the client may receive, process, and respond to the task request using locally or remotely stored information about the user's identity, habits, or desires.

Changing Prices Based on Tasks Performed by Users

In step 220, the discount module 20 determines a reduced discount price for the item responsive to the user's performance of the task. In some cases, the discount module 20 may reduce the discount price by a fixed amount (e.g., $1) or by a fixed percentage of the retail price or of the current price. In other cases, the discount module 20 may reduce the price by amount based on information about the item, other items (e.g., a competing product), the user, other users, a specification from a third party, etc. For instance, the discount module 20 may track a particular user's buying habits, the rate at which the item is selling at a given discount price, the conversion rate given the user's task performance, etc. and adjust the price by an amount tailored to the situation. This allows for flexible response to changing demand for an item and to changing demand among a particular demographic group.

In step 222, the task module 20 provides each user with the chance to buy the item at a price equal to or lower than the reduced discount price. In some cases, the task module 20 gives the user who performed the task the first chance to buy the item at the reduced discount price. If that user declines the offer, the task module 20 may publish the reduced discount price to every user—possibly for a limited time (e.g., one minute). Or the task module 20 may use the reduced discount price as the starting point for its next price reduction after the task module 20 receives notification of another performed task. In any event, each user in the group of users may purchase the product or service at a price equal to or less than the discounted price, regardless of whether or not the user has performed any tasks. When the price has decreased enough from the starting (e.g., retail) price, a given user (the buyer) may choose to buy the product or service. As soon as someone buys the product or service at the discounted price, the price resets to its original value (or to a different value), and the discounting process begins again. Thus, embodiments of task-based, decreasing-price markets enable the users to compete with each other to purchase the product at the lowest possible price.

If the system sells the item at the reduced discount price (step 224), the system resets the price of the item (step 228). For instance, the system may raise the price of the item back to the retail price. In some embodiments, the system may raise the price to a value between the retail price and the reduced discount price (the sale price) based on the conversion rate, the item inventory, a request from a third party, etc. The system can initiate a new task-based decreasing price market process 200 for the same item if desired. The server or the client may also notify the users that the item has been purchased at the discount price and, if appropriate, that a new decreasing price market is starting.

Adjusting Conversion Rate and Pricing Models

In step 225, the conversion rate module 30 collects purchase data, including the price at which the item was sold and possibly information about the purchaser, and uses the collected purchase data to determine the conversion rate. If desired (e.g., as indicated by the computed conversion rate), the conversion rate module 30 adjusts the discounting applied by the discount module 20 in step 226. To do this, the conversion rate module 30 may adjust a model that represents a particular user's purchasing habits, the purchasing habits of a group of users, sales trends associated with the item, etc.

Advertising metrics can be used to determine the conversion rates associated with task-based decreasing price markets. In advertising, there is the cost per impression (CPM) rate, which can be characterized as the online advertising cost per thousand views. A typical cost for a television commercial is about $25 CPM. This means it costs 0.025 cents per user who views the television commercial. (Hulu.com has a CPM rate of $60 for their online commercial.) This rate can get even higher if the website has more data on the demographics (personal information) of the user being exposed to the advertisement. So the more information the website can collect on its users, the more the website can charge for displaying an advertisement.

In task-based decreasing price markets, the CPM rate can be adjusted to give the website operator or software provider income from the advertising revenue associated with the "per view" rate (CPM rate) of the users. For instance, if a website has a $40 CPM rate, its operator could lower the price of its products by 3 cents and keep 1 cent for profit every time a user views an advertisement or performs another task to view a discounted price. A $20 dollar product or service would drop in price to zero dollars after 667 advertisement views given a price reduction of 3 cents per view.

The website operator(s) or software supplier(s) may also make a profit on the difference between the reduced discount prices and the retail prices of the purchased products and services. Even if a product sells for free, there may still be advertising revenue: using the numbers above, if the item's wholesale price is $10 and its retail price is $20, but it sells for $0, advertising dollars may paid $20 so profit for product is $10 plus advertising profit margin of $0.01×667 views=$6.67 for a total profit of $16.67.

The item's price can also be decreased by utilizing the difference between wholesale and retail, but subtracting out a set profit margin. In the example above, the profit is $10, but the website operator could change the profit margin to only $5 dollars and have additional $5 dollars to use in tandem with the prices decreasing when users view an advertisement. This could be used in many different ways, including: directly adding the profit margin back into pricing system; randomly adding the profit margin onto any decrease associated with the advertising views; discounting some or all items by a fixed or variable percentage; offering additional discounts, such as coupons or sales; and grouping the additional funds together and using this pool to offer incentives, such as bonuses for valued users or for referrals of new users.

Instead of using CPM rates, a model for determining price reductions in a task-based decreasing price market may leverage different ways to price the advertising impressions or tasks performed by a user. For instance, the seller may allow third parties to compete in a decreasing price market-based media pricing model in the bidders select and bid for individual advertising impressions (users). With specific demographic information and feedback on advertising, one embodiment includes a model that offers a different paradigm that CPM rate for pricing media in the online realm. This is useful because if the system uses an exchange (e.g., Google AdWords) or real-time bidding, the advertising rate may change constantly.

A Multiple-Item Task-Based Decreasing Price Market

Figure 4:
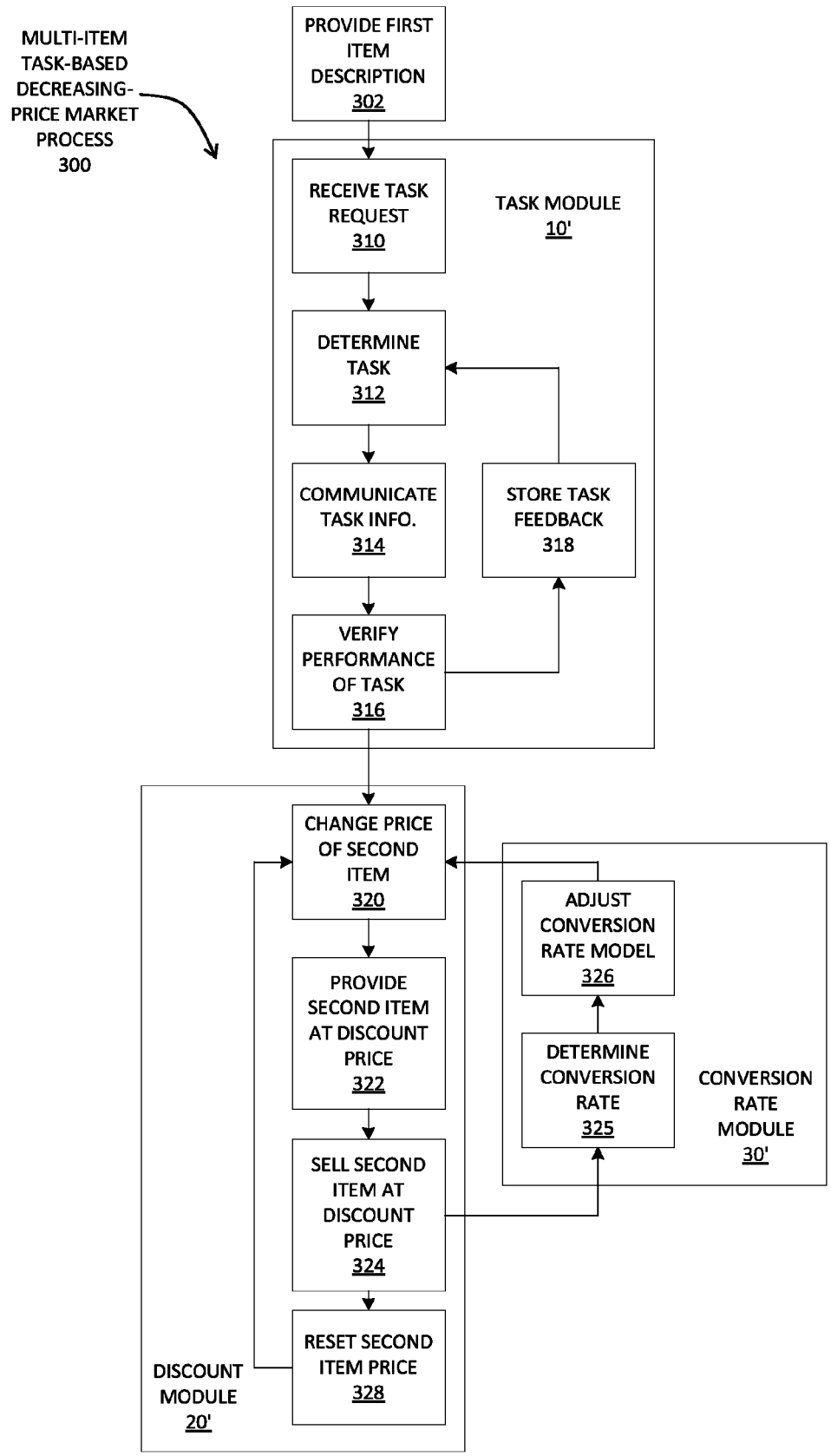
FIG. 4 illustrates a multi-item task-based decreasing price market that can be carried out using the computer network environment shown in FIG. 1.

FIG. 4 depicts a process 300 for executing a multiple-item task-based decreasing price market. Unlike the single-item process 200 illustrated in FIG. 3, the multiple-item process 300 involves discounting an item other than the item viewed by the user. For instance, the user may view a first item, such as a pair of high heels, and the system may discount a second item, such as a pair of sneakers. In some cases, the system tells the user which item is to be discounted before the user has performed the task; in other cases, the system chooses or reveals the discounted item only after the user has performed the task. Likewise, the system may or may not reveal the retail and discounted prices for both the first and second items until after the user has performed a task.

Like the single-item process 200 illustrated in FIG. 3, the multiple-item process 300 begins with providing a description of a first item to a user (step 302). A task module 10' receives a task request from the user (step 310) and may determine or select a task for the user to perform (step 312) in response to the task request. The task module 10' communicates the task information to the user (step 314) and verifies that the user has performed the task (step 316). The task module 10' may also store task feedback (step 318) for use in determining tasks for future users.

In step 320, a discount module 20' changes (e.g., reduces) the price of a second item responsive to the user's completion of the task. The first and second item may be related in some way—e.g., the first item may be a suit, and the second item may be a tie—or the two items may be completely unrelated. The items may also be identical and bundled together as part of a package—e.g., buy one, get another at a discounted price. The discount module 20' may also select the second item, possibly randomly or based on a request from the user; the user's shopping habits or identity (e.g., gender, age, income level, marital status, or IP address); a third party request (e.g., a supplier may want to push sales of a particular item); or the seller's selection (e.g., a seller may wish to reduce inventory of a particular item).

The discount module 20' may determine or reduce the discount price of the second item by a fixed amount (e.g., $1)

or by a fixed percentage (e.g., 5%) of the retail price or of the current price. In other cases, the discount module 20' may reduce the price by amount based on information about the first item, the second item, other items (e.g., competing products), the user, other users, a specification from a third party, etc. For instance, the discount module 20' may track a particular user's buying habits, the rate at which the item is selling (the conversion rate) at a given discount price, the conversion rate given the user's task performance, the conversion rate given sales of the first item, etc. and adjust the price by an amount tailored to the situation. This allows for flexible response to changing demand for an item and to changing demand among a particular demographic group.

In step 322, the discount module 20' offers the second item to the user at the discount price in response the selection of the second item and the determination of the second item's discount price. The discount module 20' also offers the second item to other users, possibly after the first user has had a chance to purchase the second item at its discount price. As soon as someone buys the second item (step 324), the discount module 20' resets the second item's price (step 328), and the decreasing price market may resume, either with the same combination of items or a different combination of items.

A conversion rate module 30' may collect purchase data, such as the price at which the second item was sold, information about the purchaser, and information about the first and second items. The conversion rate module 30' uses the collected purchase data to determine the conversion rate in step 325. If desired (e.g., as indicated by the computed conversion rate), the conversion rate module 30' adjusts the discounting applied by the discount module 20' in step 326. To do this, the conversion rate module 30' may adjust a model that represents a particular user's purchasing habits, the purchasing habits of a group of users, sales trends associated with the first and second items, etc.

A Timed or Fixed Task-Based Decreasing Price Market

Another way to implement a task-based decreasing price market is to let the users build up counts to view discount prices by watching ads or performing other tasks. The users' counts may be in the form of a certain number of discount prices views or in the form of a certain time limit for viewing discount prices. For example, suppose that a user watches five commercials in a row; in return, the system may enable her to view the current discount prices of up to five products of her choice. In some embodiments, performing one task may entitle the user to thirty seconds' worth of unlimited discount price viewing.

Figure 5:
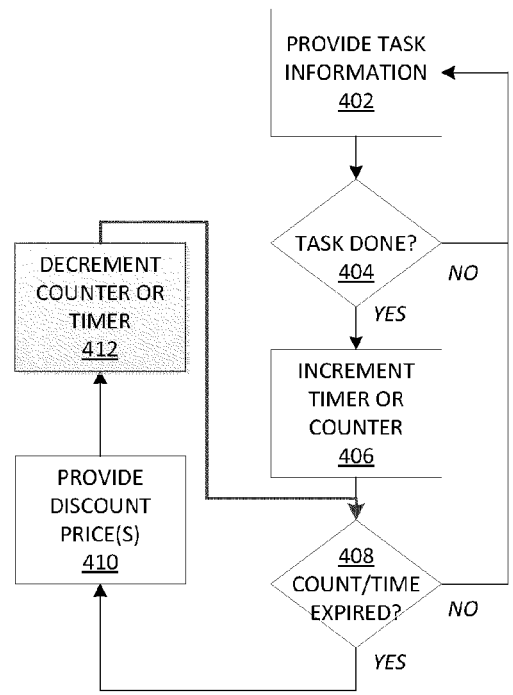
FIG. 5 depicts a timed task-based decreasing price market that can be carried out using the computer network environment shown in FIG. 1.

FIG. 5 depicts a data flow suitable for implementing a timed or fixed task-based decreasing price market process. In step 402, the system provides task information to one or more users. If the system determines that a user has performed a task (step 404), the system gives the user a viewing credit in the form of a count or time (step 406). If the user has positive viewing credit (step 408), the system provides the user with the chance to view one or more discount prices via a client and, in some embodiments, gives the user a chance to buy the associated item at the discount price. The system decrements the user's available viewing credit (step 412), and the user either continues to view discount prices or gets the opportunity to earn more credit as appropriate.

In some embodiments, a timing mechanism may force a user to view an advertisement to see products. The user is able to view products and see their retail prices (or prices set by the website). If the user clicks again on a product, the website presents the current discounted price to the user. After a certain time frame (e.g., 30 seconds, 60 seconds, etc.), the system displays a another advertisement (or information relating to some other suitable task) that blocks or replaces the current discounted price from the user's perspective. The system responds to the user's viewing of the advertisement by lowering the price of at least one of the products on the website by a predetermined amount. Once the user has finished viewing the advertisement, the user may return to shopping on the website. There are many ways to have users view commercials. For instance, the system user may present the user with a commercial each time the user clicks on a button to see the price. Other viewing control mechanisms are possible as well.

The timing mechanism that forces the user to watch an advertisement may also include a count mechanism that counts how many times the user views the current price. Once this count mechanism is triggered, the user would be forced to view an advertisement. This may prevent users from jumping on to the website and viewing, for example, six products' current prices, then hopping back off the website. The user could do this continually or continuously without triggering the timing mechanism. So if after, for example, the count mechanism was set to four, the count mechanism would trigger after four price views, forcing the user to view an advertisement. The website could also track a user's activity (e.g., by having them log in) with this mechanism even if they logged on and off many times a day.

Maintaining Ratios of Items to Users and Users to Tasks

FIG. 6 depicts the process which the system can run in the background to balance out the ratio of products 502 to users 506 and the ratio of users 506 to performed tasks 508 (e.g., ads viewed). The process may also the control the rate at which the discount price drops. The process can maintain a constant ratio of these factors by checking the number of users 506 on the website and the number of tasks 508 (advertisements being viewed) and adjusting the number or type of products 502 (blocks 504 and 512) as appropriate. For instance, the system may increase or decrease the selection of items 502, replace or remove items 502, or change the prices of items 502 as desired. If the system is batching users 504 by IP address or log-in information, the system can adjust the size of the user groups to make sure the ratios keep the discount rate at its desired value (blocks 504 and 514).

Another way to keep these factors in balance is to have users register for an account and group these users into predetermined segments. Each segment of users would have a set number of products (e.g., groups of 10,000 users to 1,000 products). Grouping the users together prevents the users' numbers and aggregate demand from exceeding the capability of the website—for instance, a website that serves 10 million users may not be capable of providing the 1 million products desired by its users. As the number of users grows, the system batches users together to keep the pricing model working correctly, possibly by capturing each user's IP address and batching the users based on IP address or subnet or by using log-in information associated with each user.

Defining and establishing a more precise pricing model based on market forces (e.g., as represented by task and purchase feedback) facilitates e-commerce transactions in a more innovative and controlling way. Task-based decreasing price markets can be used to lower prices incrementally from a retail price to a discount price, in either a random order or a systematic order, because users are watching advertisements, at a "to be determined time frame," which in turn uses a "cost per view" calculation to determine the incremental change in price. A user tolerates advertisements or other tasks (e.g., surveys, polls, disclosing personal information, etc.) to participate in this free, value-driven decreasing price market of products or services hosted on a website or as an application.

The system may also group or batch users together in response to or anticipation of changes in the conversion rate or the rate at which the item's discount price changes. For instance, if 100,000 users view advertisements associated with only 100 products, the price of each product may decrease too fast for the users to purchase a product. The user's probability of getting the product at the price they want is also diminished greatly. For example, if there are 100 users and 100 products, and the discount price drops by 3 cents every 6-9 minutes or every time a user views a commercial, the price drop may be too slow for most users even though the odds of winning the product at a particular price have now greatly increased. In another example, a user may visit the website, look around, and leave before ever viewing an advertisement or answering a verification questions, so no product or service would be discounted. This may make the product discount slower, but could be compensated by adjusting the ratios in FIG. 6 appropriately. In all three of these cases, the system may add or remove items to achieve the desired conversion rate and price change rate.

Computing Environments to Implement Task-Based Decreasing Price Markets

Embodiments of the present disclosure can be implemented and deployed in various network and computing environments, including those illustrated in the accompanying drawings. For instance, although FIG. 1 shows a network 104 between the clients 102 and the servers 106, the clients 102 and the servers 106 may be on the same network 104. The network 104 can be a local-area network (LAN), such as a company Intranet; a metropolitan area network (MAN); or a wide area network (WAN), such as the Internet or the World Wide Web. In some embodiments, there are multiple networks 104 between the clients 102 and the servers 106. In one of these embodiments, one network 104' (not shown) may be a private network and another network 104 may be a public network. In another of these embodiments, a network 104 may be a private network and a network 104' a public network. In still another of these embodiments, networks 104 and 104' may both be private networks.

The network 104 shown in FIG. 1 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network, and a wireline network. In some embodiments, the network 104 may comprise a wireless link, such as a radio-frequency channel, an infrared channel, or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including advanced mobile phone system (AMPS), time division multiple access (TDMA), code division multiple access (CDMA), frequency division multiple access (FDMA), global system for mobile communications (GSM), general packet radios service (GPRS), or universal mobile telecommunication system (UMTS). In some embodiments, different types of data may be transmitted via different protocols. In other embodiments, the same types of data may be transmitted via different protocols.

In some embodiments, the servers 106 may be grouped logically, e.g., as a server farm 38 or a machine farm 38. In another of these embodiments, the servers 106 may be dispersed geographically. In yet another embodiment, the machine farm 38 may be administered as a single entity. In still other embodiments, the machine farm 38 includes a plurality of smaller machine farms. The servers 106 within each machine farm 38 can be heterogeneous—i.e., one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools may also allow more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection.

Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the Xen hypervisor, an open source product whose development is overseen by Citrix Systems, Inc.; the VirtualServer; and virtual personal computer (PC) hypervisors provided by Microsoft or others.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

The server 106 and the client 102 may be deployed as and executed as any type or form of computing device, including as a computer, tablet, smart phone, network device, or appliance capable of communicating on any type and form of network and performing the operations described herein. For instance, a given server 106 may be or act as a file server, application server, web server, proxy server, appliance, network appliance, gateway, gateway, gateway server, virtualization server, deployment server, SSL virtual private network (VPN) server, or firewall. In one embodiment, the server 106 may be referred to as a remote machine or a node. In another embodiment, a plurality of nodes 290 may be in the path between any two communicating servers.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

In at least one embodiment, the client 102 may have different processors, operating systems, and input devices consistent with the device. For example, in one embodiment, the computing device is an iPhone made by Apple, Inc., or a similar smart phone. In another embodiment, the computing device is a Blackberry handheld or smart phone, such as the devices manufactured by Research In Motion Limited. In yet another embodiment, the computing device is a smart phone, Pocket PC, Pocket PC Phone, or other handheld mobile device supporting Microsoft Windows operating systems and software. Moreover, the computing device can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the client 102 includes a combination of devices, such as a mobile phone combined with a digital audio player or portable media player. In one of these embodiments, the client 102 is a smartphone—for example, an iPhone manufactured by Apple Computer, or a Blackberry device, manufactured by Research In Motion Limited—that is web-enabled and can receive and initiate phone calls. In yet another embodiment, the client 102 is a laptop or desktop computer equipped with a web browser and a microphone and speaker system, such as a telephony headset. In other embodiments, the communications device 102 is a Motorola RAZR or Motorola ROKR line of combination digital audio players and mobile phones.

Computing Devices to Implement Task-Based Decreasing Price Markets

FIG. 6 is a block diagram of a computing device 198 useful for practicing an embodiment of the client 102 or a server 106. The computing device 198 includes a central processing unit 121 and a main memory unit 122 that are coupled to and communicate via a via a system bus 150 (described in more detail below). FIG. 6 also shows that the computing device 198 may include a storage device 128, an installation device 116, a network interface 118, an input/output (I/O) controller 123, display devices 124a-124n (collectively, display devices 124), a keyboard 126, and a pointing device 127, such as a mouse or touch screen. The storage device 128 may include, without limitation, an operating system and software to execute some or all of a task-based decreasing price market.

The central processing unit 121 can be any logic circuitry that responds to and processes instructions fetched from the main memory unit 122. In at least one embodiment, the central processing unit 121 is provided by a microprocessor unit, such as those manufactured by: Intel Corporation of Mountain View, Calif.; Motorola Corporation of Schaumburg, Ill.; Transmeta Corporation of Santa Clara, Calif.; International Business Machines of White Plains, N.Y.; or Advanced Micro Devices of Sunnyvale, Calif. The computing device 198 may be based on any of these processors, or any other processor capable of operating as described herein. The main memory 122 may be include static random access memory (SRAM), Burst SRAM or SynchBurst SRAM (BSRAM), dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM).

The computing device 198 shown in FIG. 6 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, a flash memory drive, tape drives of various formats, USB device, hard-drive or any other device suitable for installing software and programs. The computing device 198 may further comprise a storage device, such as one or more hard disk drives or redundant arrays of independent disks, for storing an operating system and other related software, and for storing application software programs such as any program related to the software 120 for the cash flow management system. Any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to connect to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections).

In one embodiment, the computing device 198 communicates with other computing devices 100' via any type and/or form of gateway or tunneling protocol such as Secure Socket Layer (SSL) or Transport Layer Security (TLS). The network interface 118 may comprise a built-in network adapter, network interface card, PCMCIA network card, card bus network adapter, wireless network adapter, USB network adapter, modem or any other device suitable for interfacing the computing device 198 to any type of network capable of communication and performing the operations described herein.

The I/O devices may be controlled by an I/O controller 123 as shown in FIG. 6. The I/O controller may control one or more I/O devices such as a keyboard 126 and a pointing device 127, e.g., a mouse or optical pen. Furthermore, an I/O device may also provide storage and/or an installation medium 116 for the computing device 198. In still other embodiments, the computing device 198 may provide USB connections (not shown) to receive handheld USB storage devices such as the USB Flash Drive line of devices manufactured by Twintech Industry, Inc. of Los Alamitos, Calif.

In some embodiments, the computing device 198 may comprise or be connected to multiple display devices 124, which each may be of the same or different type and/or form. As such, any of the I/O devices 130 and/or the I/O controller 123 may comprise any type and/or form of suitable hardware, software, or combination of hardware and software to support, enable or provide for the connection and use of one or more display devices 124 by the computing device 198. For example, the computing device 198 may include any type and/or form of video adapter, video card, driver, and/or library to interface, communicate, connect or otherwise use the display devices 124. In one embodiment, a video adapter may comprise multiple connectors to interface to multiple display devices 124. In other embodiments, the computing device 198 may include multiple video adapters, with each video adapter connected to one or more of the display devices 124.

In some embodiments, any portion of the operating system of the computing device 198 may be configured for using multiple displays 124. In other embodiments, one or more of the display devices 124 may be provided by one or more other computing devices connected to the computing device 198, for example, via the network 104. These embodiments may include any type of software designed and constructed to use another computer's display device as a second display device 124a for the computing device 198. One ordinarily skilled in the art will recognize and appreciate the various ways and embodiments that a computing device 198 may be configured to have multiple display devices 124.

In further embodiments, an I/O device 130 may act as a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, a Serial Attached small computer system interface bus, or a HDMI bus.

Figure 7A:
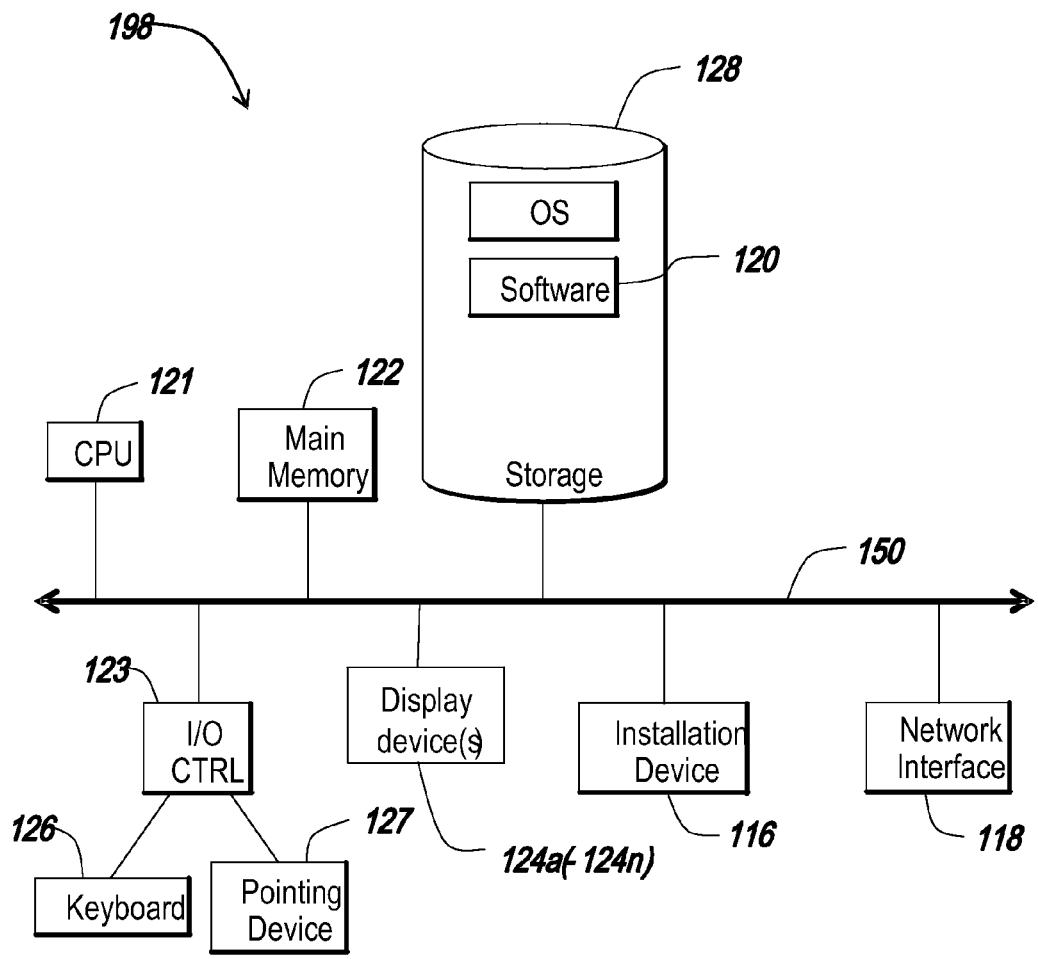
FIGS. 7A and 7B depict computing devices suitable for acting as the clients and servers shown in FIG. 1
Figure 7B:
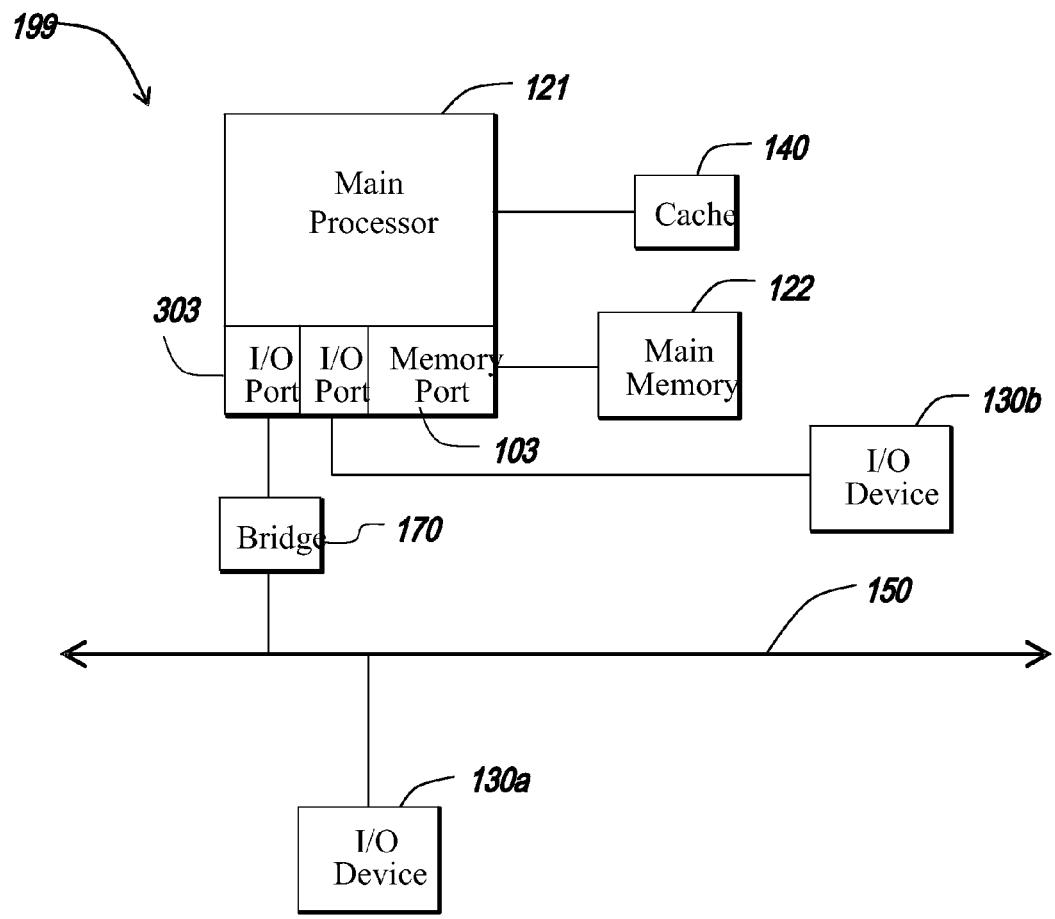

FIG. 7B depicts an alternative computing device 199 in which the processor 121 communicates directly with main memory 122 via a memory port 103. The main memory unit 122 may be one or more memory chips capable of storing data and allowing any storage location to be directly accessed by the microprocessor 121, which may based on or include any suitable processor, including those described above. The main memory 122 may be based on any of the above described memory chips, or any other available memory chips capable of operating as described herein.

The computing device 199 may also include additional elements, such as a memory port 103, a bridge 170, one or more I/O devices 130a-130n (generally, I/O devices 130), and a cache memory 140 communicatively coupled to the central processing unit 121. The main processor 121 communicates directly with cache memory 140 via a secondary bus, sometimes referred to as a backside bus. In other embodiments, the main processor 121 communicates with cache memory 140 using a system bus 150. Cache memory 140 typically has a faster response time than main memory 122 and may be provided by SRAM, BSRAM, or EDRAM.

The computer device 199 uses both local busses and direct to communicate with I/O devices 130: the processor 121 communicates with input device 130a using a local interconnect bus while communicating with input device 130b directly. For instance, the main processor 121 may communicate directly with I/O device 130b via a HYPERTRANSPORT, RAPIDIO, or INFINIBAND I/O port 303. In addition, various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. In addition, Like the computing device 198 of FIG. 7A, the computing device shown in FIG. 7B may include or be operatively coupled to any of a wide variety of input devices 130a-130n (collectively, input devices 130) including, but not limited to keyboards, mice, trackpads, trackballs, microphones, dials, and drawing tablets. The computing device 198 may include or be operatively coupled to any of a wide variety of output device including, but not limited to video displays, speakers, inkjet printers, laser printers, and dye-sublimation printers.

The computing devices 198 and 199 of FIGS. 7A and 7B, respectively, may each operate under the control of an operating system, which controls scheduling of tasks and access to system resources. An embodiment of a computing device may run any suitable operating system, including but not limited to: any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 1980, WINDOWS NT 3.51, WINDOWS NT 4.0, WINDOWS CE, WINDOWS MOBILE, WINDOWS XP, WINDOWS VISTA, and WINDOWS 7, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

Each computer system described herein can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. An embodiment of a computer system may have sufficient processor power and memory capacity to perform the operations described herein. For example, the computer system 100 may comprise a device of the IPOD, IPHONE, or APPLE TV family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED, NINTENDO REVOLUTION, or a NINTENDO WII device manufactured by Nintendo Co., Ltd., of Kyoto, Japan, an XBOX or XBOX 360 device manufactured by the Microsoft Corporation of Redmond, Wash.

CONCLUSION

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

A flow diagram is used herein. The use of flow diagrams is not meant to be limiting with respect to the order of operations performed. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method of price discounting, the method comprising:
    providing, by a device, a representation of an item for sale to a plurality of users, the item having a retail price and a discount price, the discount price discounted from the retail price based on tasks performed by one or more of the plurality of users;
    communicating, to a first user in the plurality of users, information on a task to be performed by the first user;
    receiving, by the device, an indication that the first user has performed the task;
    reducing the discount price of the item in response to the indication that the first user has performed the task; and
    providing, by the device, the item for purchase at a price equal to or less than the reduced discount price to each user of the plurality of users until any user of the plurality of users purchases the item at the reduced discount price.

2. The method of claim 1 wherein the discount price is discounted from the retail price based on a number of tasks performed by users in the plurality of users.

3. The method of claim 1 wherein the task comprises at least one of viewing an advertisement, answering a question about a product or service, participating in a survey, providing an opinion, providing demographic information, providing information about a past or future purchase, signing up for a mailing list, and downloading an application or file.

4. The method of claim 1 further comprising:
    selecting the task based on information about at least one of the item, the first user, and the plurality of users, and a specification of the task by a third party.

5. The method of claim 4 wherein the information about the first user includes at least one of age, income, gender, purchasing history, internet browsing history, and internet protocol address.

6. The method of claim 1 wherein reducing the discount price is based on at least one of the indication that the first user performed the task, a purchasing history associated with the first user, and a browsing history of the first user.

7. The method of claim 1 further comprising:
    receiving, by the device, a request from the first user to view the discount price of the item before the first user can view the discount price; and
    preventing any user in the plurality of users from viewing the discount price before receiving the indication that the first user has performed the task.

8. The method of claim 1 further comprising:
    receiving, by the device, an indication that a second user in the plurality of users has performed another task; and
    reducing the discount price based on the indication that the second user in the plurality of users has performed the other task.

9. The method of claim 1 further comprising:
    determining a conversion rate at which a user in the plurality of users purchases the item at the reduced discount price per a number of tasks performed.

10. The method of claim 9 further comprising:
    adjusting a model used by the device to determine the reduced discount price based on the conversion rate.

11. A system of price discounting, the system comprising:
    a server providing a representation of an item for sale to a plurality of users, the item having a retail price and a discount price, the discount price discounted from the retail price based on a number of tasks performed by one or more of the plurality of users;
    a task module of the server communicating information to a first user in the plurality of users on a task to be performed by the first user and receiving an indication that the task has been performed by the first user; and
    a discount module of the server reducing the discount price of the item in response to the indication that the task has been performed,
    wherein the server provides the item for purchase at a price equal to or less than the reduced discount price to each user of the plurality of users until any user of the plurality of users purchases the item at the reduced discount price.

12. The system of claim 11 wherein the server prevents any user of the plurality of users from viewing the reduced discount price before the user can view the discount price.

13. The system of claim 11 wherein the task module is further configured to select the task based on information about at least one of the item, the first user, the plurality of users, and a specification of the task by a third party.

14. The system of claim 11 wherein the task module is further configured to store the indication that the first user has performed the task in a database and to select the task based on data in the database.

15. The system of claim 11 wherein the task module is further configured to receive an indication that a second user in the plurality of users has performed another task, and wherein the discount module is further configured to reduce the discount price based on the indication that the second user in the plurality of users has performed the other task.

16. The system of claim 11 wherein the discount module is configured to reduce the discount price based on at least one of the indication that the first user performed the task, a purchasing history associated with the first user, and a browsing history of the first user.

17. The system of claim 11 wherein the discount module is further configured to enable each user in the plurality of users to purchase the item at the retail price in response to an indication that the item has been purchased at the discount price.

18. The system of claim 11 further comprising:
a conversion rate module operably coupled to the transaction module and configured to determine a conversion rate at which a user in the plurality of users purchases the item at the reduced discount price per a number of tasks performed.

19. A method of providing a decreasing pricing market, the method comprising:
providing, by a device, a representation of a plurality of items for sale to a plurality of users, each item of the plurality of items having a respective retail price and a respective discount price, the discount price discounted from the retail price based on tasks performed by one or more of the plurality of users;
providing, in response to a first user in the plurality of users viewing a first item of the plurality of items, information relating to a task to the first user;
receiving, by the device, an indication that the first user has performed the task;
determining a discount price of a second item of the plurality items in response to the indication that the first user has performed the task in connection with viewing the first item; and
providing, by the device, the second item for purchase at the discount price to each user of the plurality of users until any user of the plurality of users purchases the second item at the discount price of the second item.

20. The method of claim 19 further comprising:
preventing any user in the plurality of users from viewing any discount price before receiving the indication that the first user has performed the task.

* * * * *